March 25, 1952  A. W. BAKER  2,590,671
EXPLOSIVE CARTRIDGE ASSEMBLY
Filed June 19, 1948  2 SHEETS—SHEET 1
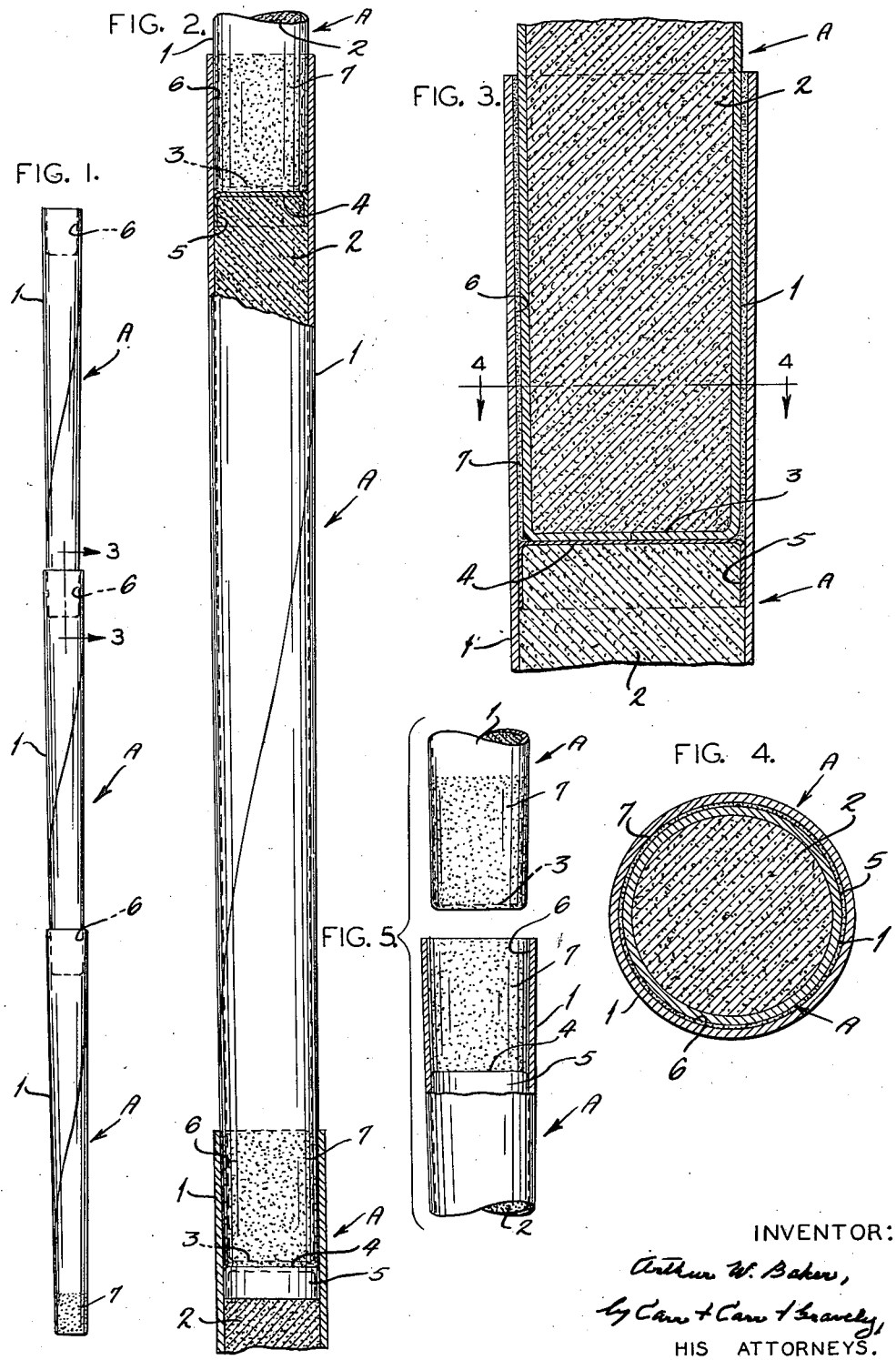
INVENTOR:
Arthur W. Baker,
by Carr & Carr & Gravely,
HIS ATTORNEYS.

March 25, 1952 A. W. BAKER 2,590,671
EXPLOSIVE CARTRIDGE ASSEMBLY
Filed June 19, 1948 2 SHEETS—SHEET 2
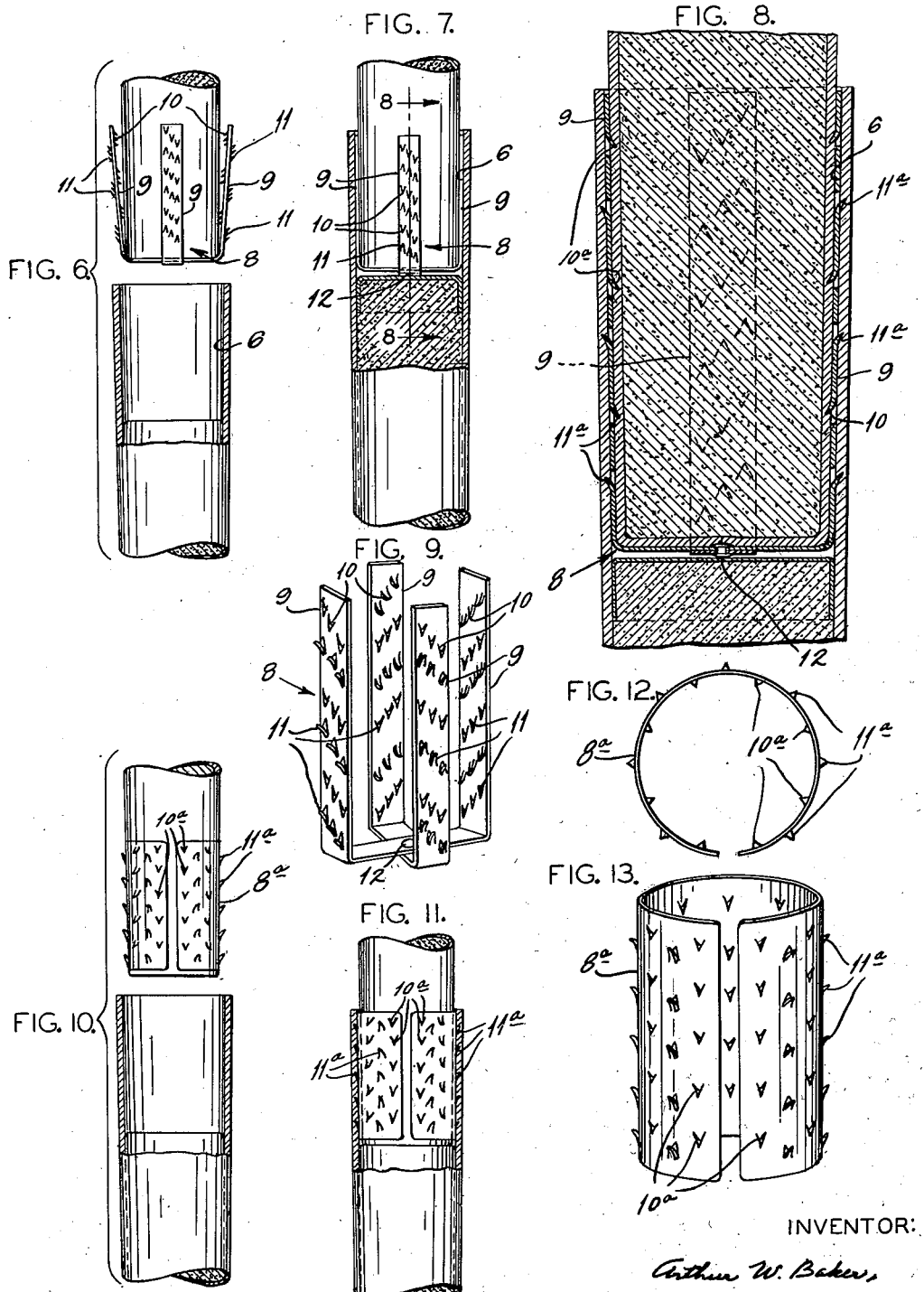

Patented Mar. 25, 1952

2,590,671

UNITED STATES PATENT OFFICE 2,590,671

EXPLOSIVE CARTRIDGE ASSEMBLY

Arthur W. Baker, Webster Groves, Mo., assignor to Illinois Powder Manufacturing Company, St. Louis, Mo., a corporation of Illinois Application June 19, 1948, Serial No. 34,018

3 Claims. (Cl. 102—24)

This invention relates to explosive cartridge assemblies or columns of the kind used for geophysical prospecting, particularly seismograph prospecting for oil.

The invention has for its principal object to provide a simple and inexpensive arrangement for quickly and easily securing together a plurality of identical cartridges in end to end propagating relation to form a strong and rigid multi-cartridge column or stick which can be easily handled and forced through a rough, muddy shot hole without separation of the cartridges.

The invention consists in a cartridge having at one end an axial socket and at the other end a portion adapted for endwise insertion in the socket of a counterpart cartridge, and in providing means for preventing separation of the telescoping ends of the said cartridges. The invention also consists in securing the telescoped ends of adjacent cartridges together by means of a tacky non-drying adhesive which may be applied to the cartridges at the place of manufacture. The invention also consists in providing a strip that extends between the wall of the socket at one end of a cartridge and the socket engaging end of an adjacent cartridge and is formed with a multiplicity of prongs adapted, when said ends are brought into telescopic relation, to bite or dig into the engaged portions of the two cartridges and prevent endwise separation thereof. The invention also consists in gradually increasing the diameter of the cartridges from end to end thereof so that the small end of one cartridge will telescope into the large end of an adjacent cartridge. The invention also consists in the parts and combinations and arrangements of parts hereinafter described and claimed.

In the accompanying drawings, which form part of this specification and wherein like symbols refer to like parts wherever they occur, Fig. 1 is a side elevational view of an explosive cartridge assembly embodying my invention, Fig. 2 is an enlarged part side elevational and part longitudinal sectional view of a portion of the cartridge assembly, Fig. 3 is an enlarged fragmentary central longitudinal sectional view on the line 3—3 in Fig. 1, Fig. 4 is a cross-sectional view on the line 4—4 in Fig. 3, Fig. 5 is a fragmentary side elevational view showing two cartridges in position for assembly, the socket end of the lower cartridge being shown in section, Fig. 6 is a view similar to Fig. 5 showing a modified arrangement for locking the cartridge ends together, Fig. 7 is a view, similar to Fig. 6, showing the two cartridges assembled, Fig. 8 is an enlarged fragmentary central longitudinal sectional view on the line 8—8 in Fig. 7, Fig. 9 is a perspective view of the locking device shown in Figs. 6, 7 and 8, Fig. 10 is a view, similar to Fig. 6, showing a further modification of the cartridge locking means, Fig. 11 is a view, similar to Fig. 10, showing the two cartridges assembled, Fig. 12 is an end elevational view of the locking device shown in Figs. 10 and 11; and Fig. 13 is a perspective view of the last mentioned locking device.

The explosive cartridge column or stick shown in the accompanying drawings comprises a plurality of counterpart cartridges A secured together in endwise abutting relation. Each cartridge comprises a tubular casing or shell 1 that tapers or gradually decreases in diameter from the upper to the lower end thereof and is packed with a suitable grade of gelatin dynamite 2 to within a short distance from the top of said casing. The casing 1 is preferably made from a sheet of spirally wound, adhesively united paper formed on a tapered mandrel (not shown) to give said shell the desired taper.

The small, lower end of the casing 1 is closed by inwardly bent or crimped portions 3 at said end. The gelatin dynamite 2 is held in place in the upper end of the shell 1 by means of a paper closure disk 4 located therein a short distance below the top thereof. The closure disk 4 has a depending peripheral flange 5 that is adhesively secured to the interior surface of the casing 1, whereby said disk cooperates with the portion of the casing located thereabove to form a downwardly tapering socket 6 in the large upper end of said casing. By this arrangement, the cartridges may be assembled into column form by inserting the small tapering end of one cartridge into the correspondingly tapered socket 6 in the large upper end of the cartridge located immediately therebelow. As shown in Figs. 1 to 5, inclusive, the small end of one cartridge may be secured in the axial socket 6 in the large end of the other cartridge by means of any suitable non-drying tacky adhesive 7 which is applied to the wall of said socket and/or the cartridge end having the slip-fit therein preferably at the place of manufacture of the cartridges.

In the construction shown in Figs. 6 to 9, inclusive, the means for securing the small end of one cartridge in the socket 6 of the other cartridge comprises a locking device made of one or more U-shaped metal strips 8 that are slipped over the small end of the cartridge. The legs 9 of each U-shaped locking strip 8 are provided on their inner and outer side faces with a multiplicity of gripping elements preferably in the form of prongs or barbs struck from said legs. The prongs 10 on the inner faces of the leg 9 of each U-shaped locking strip 8 are inclined inwardly and downwardly, and the prongs 11 on the outer side face of said leg are inclined outwardly and upwardly. As shown in the drawings, the locking device preferably comprises two of the U-shaped strips 8 that are riveted or otherwise permanently secured together, as at 12, in crossed relation at their lower ends so that the upstanding legs 9 of the two strips are disposed in circumferentially spaced relation around the small lower end portion of the cartridge embraced thereby. With this arrangement, the cartridges are assembled preferably by slipping the mechanical locking device over the small end of one cartridge and then forcing said end of said cartridge axially into the tapered socket or pocket 6 in the upper end of the other cartridge, whereby the downwardly and inwardly inclined prongs 10 on the inner sides of the legs 9 of the U-shaped strips 8 grip or dig into the small end of the paper casing of the first mentioned cartridge and the upwardly and outwardly inclined prongs 11 grip or dig into the paper wall of the socket in said other cartridge, thus firmly locking the two cartridges together against endwise separation.

In the modified construction shown in Figs. 10 to 13, inclusive, the cartridge locking means is shown in the form of a split sleeve 8a which embraces the small, socket-engaging end of the cartridge and has a multiplicity of prongs or barbs struck therefrom on its inner and outer surfaces, the barbs 10a on the inner surface being inclined inwardly and downwardly and the barbs 11a on the outer surface being inclined outwardly and upwardly. With this arrangement, the small lower end of the cartridge with the barbed sleeve 8a thereon is forced axially into the socket 6 in the large upper end of the other cartridge and the inner barbs 10 dig into the small end of the first mentioned cartridge and the outer barbs 11a dig into the wall of the socket in said other cartridge, thereby rigidly securing the two cartridges together in end to end relation.

The hereinbefore arrangement has several important advantages. The paper shell or casing of the cartridge may be quickly and easily formed on a tapered mandrel of a conventional shell forming machine and packed with explosive in a conventional manner. The small end of the cartridge is closed in the conventional manner and the socket at the large end of the cartridge may be formed merely by locating the closure disk inwardly of said end. The tapering of the cartridge enables the small end of one cartridge to be easily telescoped within the socket in the large end of another cartridge; and the hereinbefore described securing means associated with the telescoped ends of the two cartridges serves to hold them firmly together in end to end relation under all conditions of use. Another important advantage of the above arrangement is that it dispenses with the separate relatively long exterior coupling sleeves heretofore employed for securing together a plurality of cartridges in column form.

What I claim is:

1. An explosive cartridge assembly comprising a plurality of identical cartridges disposed in end to end relation, each of said cartridges comprising a paperboard casing that tapers uniformly from end to end thereof and has a correspondingly tapered socket in its large end and a flush small end fitting into the large socket end of an adjacent cartridge, and separate means located between and in engagement with the opposing faces of said engaged correspondingly tapered socket and flush small cartridge ends for preventing endwise separation thereof, said means comprising a substantially U-shaped strip extending between the opposing side and end faces of said socket and the cartridge end therein and having a plurality of prongs embedded in said opposing side faces of said socket and the cartridge end therein.

2. The combination set forth in claim 1, wherein said prongs are inclined in a direction that will bring about an increased gripping action thereof under forces tending to separate said cartridge end from said socket.

3. An explosive cartridge assembly comprising a plurality of identical cartridges disposed in end to end relation, each of said cartridges comprising a paperboard casing that tapers uniformly from end to end thereof and has a correspondingly tapered socket in its large end and a flush small end fitting into the large socket end of an adjacent cartridge, and separate means located between and in engagement with the opposing faces of said engaged correspondingly tapered socket and flush small cartridge end for preventing endwise separation thereof, said means comprising two substantially U-shaped strips connected together in crossed relation at their closed ends and located in said socket, said U-shaped strips having a plurality of prongs embedded in the opposing side faces of said socket and flush small cartridge end disposed therein, said prongs being inclined in a direction that will bring about an increased gripping action thereof under forces tending to separate said cartridge end from said socket.

ARTHUR W. BAKER.

REFERENCES CITED

The following references are of record in the file of this patent:

UNITED STATES PATENTS

| Number | Name | Date |
|---|---|---|
| 422,439 | Peters | Mar. 4, 1890 |
| 903,529 | Wray | Oct. 10, 1908 |
| 949,778 | Pringle | Feb. 22, 1910 |
| 2,353,739 | Magill | July 18, 1944 |
| 2,377,151 | Huber | May 29, 1945 |
| 2,396,518 | Martin | Mar. 12, 1946 |
| 2,401,140 | Cordie | May 28, 1946 |
| 2,403,488 | Bennett | July 9, 1946 |

FOREIGN PATENTS

| Number | Country | Date |
|---|---|---|
| 15,118 | Great Britain | Oct. 20, 1889 |
| 323 | Great Britain | Jan. 6, 1902 |
| 377,341 | Germany | June 16, 1923 |